United States Patent
Fang et al.

(10) Patent No.: US 12,465,103 B2
(45) Date of Patent: Nov. 11, 2025

(54) COMFORTABLE LIGHTWEIGHT BULLET-PROOF AND STAB-RESISTANT SUIT AND PREPARATION METHOD THEREOF

(71) Applicants: Beijing Aerospace Kaien New & Advanced Material Co. Ltd., Beijing (CN); Beijing Institute of Aerospace Testing Technology, Beijing (CN); Beijing Aerospace Rate Mechanical & Electrical Engineering Co. Ltd., Beijing (CN)

(72) Inventors: Xinling Fang, Beijing (CN); Yuankun Liu, Beijing (CN); Dongmei Xu, Beijing (CN); Qingsong Ai, Beijing (CN); Hongxin Li, Beijing (CN); Hong Chen, Beijing (CN); Zhaoyang Liu, Beijing (CN); Zhiyong Pan, Beijing (CN); Zhongwei Wu, Beijing (CN); Zongjia Li, Beijing (CN); Nianhua Li, Beijing (CN); Liandong Jiang, Beijing (CN); Ruiling Wang, Beijing (CN); Long Hu, Beijing (CN); Liqiang Fu, Beijing (CN); Bing Zhang, Beijing (CN); Junhong Dai, Beijing (CN); Fangning Xue, Beijing (CN)

(73) Assignees: BEIJING AEROSPACE KAIEN NEW & ADVANCED MATERIAL CO. LTD., Beijing (CN); BEIJING INSTITUTE OF AEROSPACE TESTING TECHNOLOGY CHINA, Beijing (CN); BEIJING AEROSPACE RATE MECHANICAL & ELECTRICAL ENGINEERING CO. LTD., Beijing (CN)

( * ) Notice: Subject to any disclaimer, the term of this patent is extended or adjusted under 35 U.S.C. 154(b) by 314 days.

(21) Appl. No.: 18/139,225

(22) Filed: Apr. 25, 2023

(65) Prior Publication Data
US 2024/0156195 A1 May 16, 2024

Related U.S. Application Data

(63) Continuation of application No. PCT/CN2022/131544, filed on Nov. 11, 2022.

(51) Int. Cl.
*A41D 31/24* (2019.01)
*A41D 13/05* (2006.01)

(52) U.S. Cl.
CPC ............. *A41D 31/24* (2019.02); *A41D 13/05* (2013.01)

(58) Field of Classification Search
CPC .................................. A41D 31/24; A41D 13/05
See application file for complete search history.

(56) References Cited

U.S. PATENT DOCUMENTS

2016/0200882 A1* 7/2016 Bhat ...................... B32B 5/022
442/327

FOREIGN PATENT DOCUMENTS

| CN | 101397757 A | 4/2009 |
| CN | 202372057 U | 8/2012 |

(Continued)

OTHER PUBLICATIONS

Machine translation CN103911769 (Year: 2014).*

(Continued)

*Primary Examiner* — Elizabeth M Imani
(74) *Attorney, Agent, or Firm* — Davis Wright Tremaine LLP

(57) ABSTRACT

The present application provides a comfortable lightweight bullet-proof and stab-resistant suit and a preparation method (Continued)

thereof. A first aspect of the present application provides a comfortable lightweight bullet-proof and stab-resistant suit, including a sheath and a protection core sheet disposed in the sheath, and the protection core sheet includes a first protection layer, a second protection layer, a third protection layer and a buffer layer which are sequentially stacked together. The bullet-proof and stab-resistant suit provided in the present application has better response protection characteristics in the process of bullet penetration or knife tip stab, and the prepared aramid unidirectional cloth has low areal density, apparent flatness, no bubbles, and excellent softness, so that any bending within 180° can be realized.

20 Claims, 1 Drawing Sheet

(56) References Cited

FOREIGN PATENT DOCUMENTS

| | | |
|---|---|---|
| CN | 103911769 A | 7/2014 |
| CN | 203893751 U | 10/2014 |
| CN | 204495189 U | 7/2015 |
| CN | 205619831 U | 10/2016 |
| CN | 206638090 U | 11/2017 |
| CN | 107653573 A | 2/2018 |
| CN | 107664463 A | 2/2018 |
| CN | 110793394 A | 2/2020 |
| CN | 111457790 A | 7/2020 |
| CN | 112321975 A | 2/2021 |
| CN | 111457790 B | 12/2021 |
| CN | 114061374 A | 2/2022 |
| EP | 2276995 B1 | 1/2011 |
| KR | 20170080093 A | 7/2017 |
| WO | 2022063286 A1 | 3/2022 |

OTHER PUBLICATIONS

Chinese Patent Office, "International Search Report" in applicaiton No. PCT/CN2022/131544, dated Aug. 7, 2023, 10 pages.

The State Intellectual Property Office of People's Republic of China, "The First Office Action" in Application No. 202280005717.8, Jun. 21, 2025, 13 pages.

The State Intellectual Property Office of People's Republic of China, "Notice of Registration Procedures" in Application No. 202280005717.8, Sep. 2, 2025, 12 pages.

Qing-Song, Ai, et al., "Study on the Stab Performance of Aramid UD Cloth" China Academic Journal Electronic Publishing House, 2019, 5 pages.

* cited by examiner

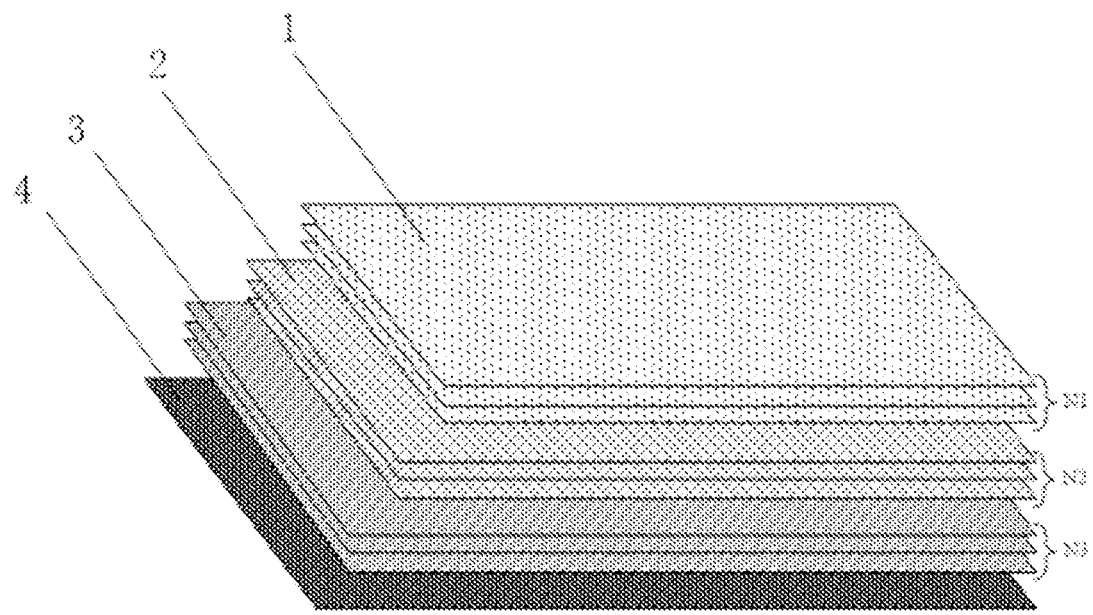

US 12,465,103 B2

COMFORTABLE LIGHTWEIGHT BULLET-PROOF AND STAB-RESISTANT SUIT AND PREPARATION METHOD THEREOF

CROSS-REFERENCE TO RELATED APPLICATIONS

The present application is a continuation of International Application No. PCT/CN2022/131544, filed on Nov. 11, 2022. The disclosure of the aforementioned application is incorporated herein by reference in its entirety.

TECHNICAL FIELD

The present application relates to the technical field of individual protection equipment, in particular to a comfortable lightweight bullet-proof and stab-resistant suit and a preparation method thereof.

BACKGROUND

With the complexity of modern battlefield environment, the single protection product only with bullet-proof or stab-resistant function cannot resist various physical attacks on battlefield. Therefore, the individual protection product with bullet-proof and stab-resistant functions at the same time is favored by warfighters. A bullet-proof and stab-resistant suit, also known as double protection suit, refers to the individual protection product that has not only the bullet-proof function but also the stab-resistant function.

At present, the development of the bullet-proof and stab-resistant suit mainly has three directions: first, the hard protection materials are combined to achieve bullet-proof and stab-resistant functions, and the hard materials mainly include metal or ceramic materials, having disadvantages that the finished product of protection suit is too bulky, poor in softness, and extremely uncomfortable in wearing, which seriously affects the individual's normal behaviors, such as squatting, jumping, running and arm bending, etc.; second, single protection materials with a bullet-proof performance or a stab-resistant performance are physically laminated to achieve the bullet-proof and stab-resistant functions, which has the disadvantages that there are large number of the laminated layers of the protection materials, the resulting bullet-proof and stab-resistant suit is relatively thick and heavy, the wearing comfortability is poor, and the protection performance is difficult to achieve an ideal effect; third, a composite bullet-proof and stab-resistant suit with the bullet-proof function and the stab-resistant function at the same time is developed. Under the background of the continuous development of global social economy and the continuous improvement of people's security awareness, the application of individual protection products has gradually developed from the original military and police field to the wider civil field, and the application demand of security guards, taxi drivers, bank employees and other workers rises continuously. The bullet-proof and stab-resistant suit has a broad application prospect in the market, but there still exits the problems of large weight, insufficient softness and poor wearing comfortability. Therefore, how to reduce the weight of the bullet-proof and stab-resistant suit and improve the softness and wearing comfortability of the bullet-proof and stab-resistant suit is a continuous concern for those skilled in the art.

SUMMARY

The present application provides a comfortable lightweight bullet-proof and stab-resistant suit and a preparation method thereof, for reducing the weight of the bullet-proof and stab-resistant suit, and improving the softness and wearing comfortability of the bullet-proof and stab-resistant suit.

A first aspect of the present application provides a comfortable lightweight bullet-proof and stab-resistant suit, the bullet-proof and stab-resistant suit includes a sheath and a protection core sheet disposed in the sheath, the protection core sheet includes a first protection layer, a second protection layer, a third protection layer, and a buffer layer which are sequentially stacked together;

the first protection layer includes 5-15 layers of first aramid unidirectional cloth woven from aramid fiber and a first adhesive, and the first adhesive includes waterborne polyurethane, 1,4-butanediol, methyltrimethoxysilane, methyltrichlorosilane, dicyandiamide and nano-montmorillonite; and the second protection layer includes 10-25 layers of second aramid unidirectional cloth woven from aramid fiber and a second adhesive, and the second adhesive includes waterborne polyurethane, waterborne epoxy resin, methyl methacrylate, ethylene glycol, N-methyl diethanolamine and titanate coupling agent;

the third protection layer includes 5-12 layers of third aramid unidirectional cloth woven from aramid fiber and a third adhesive, and the third adhesive includes waterborne polyurethane, aminomethyl silicone oil, ammonium polyphosphate and titanate coupling agent.

In the bullet-proof and stab-resistant suit provided in the present application, the sheath is configured to be worn on a protected individual, and the protection core sheet is disposed inside the sheath. In one embodiment, FIG. 1 is a structural schematic diagram of a protection core sheet provided in an embodiment of the present application. As shown in FIG. 1, the protection core sheet includes a first protection layer 1, a second protection layer 2, a third protection layer 3 and a buffer layer 4 which are stacked sequentially together. The first protection layer 1 is located on a side away from the protected individual, and the buffer layer 4 is located on a side close to the protected individual. It is to be noted that, for convenience of description, a dimension of each layer is appropriately changed in FIG. 1. In fact, the first protection layer 1, the second protection layer 2, the third protection layer 3 and the buffer layer 4 have the same dimensions. Specifically, the first protection layer 1 has the most excellent bullet-proof performance and softness; the third protection layer 3 has the most excellent stab-resistant performance and the relatively worst softness; the second protection layer 2 has relatively balanced bullet-proof performance and the stab-resistant performance, the bullet-proof performance thereof is slightly inferior to that of the first protection layer, the stab-resistant performance thereof is slightly inferior to that of the third protection layer, and the softness thereof is equivalent to that of the first protection layer 1. In order to better realize the lightweight characteristic and excellent comfortability of the bullet-proof and stab-resistant suit, considering the general rules of first long-range attack (bullet impact) and then close-in attack (knife stab) at the same time, the first protection layer 1 is placed on the outermost layer of a body to first resist the penetration damage due to a bullet. Through the synergistic effect of the first protection layer 1 and the second protection layer 2, the kinetic energy of the bullet is absorbed and consumed to a maximum extent, and the continuous penetration of the bullet is prevented, which ensures the integrity of the third protection layer 3 to a maximum extent. When facing the subsequent knife damage, the third protection layer 3 provides sufficient stab protection to meet the requirements of the protected individual for the bullet-proof and stab-resistant performance.

The first protection layer 1, the second protection layer 2, and the third protection layer 3 are all formed from aramid unidirectional cloth by laminating together. In order to achieve different performances, materials and numbers of laminated layer of aramid unidirectional cloth in respective protection layers are not the same.

Specifically, the first protection layer 1 includes 5-15 layers of first aramid unidirectional cloth, that is N1=5-15 layers. The first aramid unidirectional cloth is woven from aramid fiber and a first adhesive, where, the aramid fiber, as a novel high-tech synthetic fiber, has excellent performances such as ultra-high strength, high modulus, high temperature resistance, acid resistance and alkali resistance, and light weight, meantime, the aramid fiber is low in cost and is a widely-used raw material for the bullet-proof and stab-resistant suit at present. The aramid unidirectional cloth may be obtained by soaking in an adhesive, aligning and weaving the aramid fiber. Therefore, the property of the adhesive determines the performance of the aramid unidirectional cloth to a great extent. In order to ensure that the first protection layer has better bullet-proof performance and softness, the first adhesive includes waterborne polyurethane, 1,4-butanediol, methyltrimethoxysilane, methyltrichlorosilane, dipolycyanamine and nano-montmorillonite. Waterborne polyurethane is a basic component of the first adhesive, and waterborne polyurethane may be modified by adding methyltrimethoxysilane and methyltrichlorosilane, so as to improve the characteristics of an interface where waterborne polyurethane and aramid fiber are bonded, ensure that the interlayer force of the woven aramid unidirectional cloth is kept at a proper value, and ensure that the prepared aramid unidirectional cloth has good softness. The addition of dicyandiamide may enhance the flame retardancy of waterborne polyurethane, and improve the protection ability of the first protection layer as the outermost layer. The addition of nano-montmorillonite enhances the impact resistance of the aramid unidirectional cloth, and the bullet penetration resistance is stronger. 1,4-butanediol can improve the compatibility among the components, ensure the uniform mixing among the material components, and at the same time, improve the levelling property of the first adhesive on a surface of the aramid unidirectional cloth. The prepared aramid unidirectional cloth has better apparent performance.

As an inorganic filler, nano-montmorillonite is poor in solubility in waterborne polyurethane and can only be uniformly dispersed therein. When the particle size of nano-montmorillonite is too small, agglomeration will occur, so that the prepared aramid unidirectional cloth is unqualified and the reinforcing effect of nano-montmorillonite is lost; and when the particle size is too large, the surface of the aramid unidirectional cloth will be uneven and the reinforcing effect is weakened. Therefore, a particle size distribution of nano-montmorillonite used in the present application is 30-50 nm.

Further, in the first adhesive, a mass ratio of waterborne polyurethane, 1,4-butanediol, methyltrimethoxysilane, methyltrichlorosilane, dipolycyanamine and nano-montmorillonite is 1000:(60-80):(7-10):(10-15):(8-12):(5-7).

In a weaving process, the above components are mixed according to a certain mass ratio and uniformly stirred to obtain a first adhesive, and then the first adhesive is added to an adhesive cartridge of a loom, and a weaving is performed with aramid fiber to obtain the first aramid unidirectional cloth. The specific process may be carried out according to the conventional technical means in the art.

The second protection layer includes 10-25 layers of second aramid unidirectional cloth, that is, N2=5-15 layers, a second adhesive is used in a process of the unidirectional weaving of second aramid. The second adhesive includes waterborne polyurethane, waterborne epoxy resin, methyl methacrylate, ethylene glycol, N-methyl diethanolamine and titanate coupling agent. Waterborne polyurethane is a basic component of the second adhesive, and may be optimized and modified by adding waterborne epoxy resin, methyl methacrylate and N-methyl diethanolamine. Waterborne epoxy resin enhances the impact resistance of the aramid unidirectional cloth; N-methyl diethanolamine and methyl methacrylate can improve the flexibility of the second adhesive, further improve the softness of the second aramid unidirectional cloth. At the same time, it is ensured that aramid fiber after spreading can be laid tightly, there is sufficient bonding strength between the second adhesive and the aramid fiber, and the stab resistance of the aramid unidirectional cloth is enhanced. With ethylene glycol and titanate coupling agent, all materials can be mixed evenly to a maximum extent to achieve good compatibility and to ensure that the prepared second adhesive has good bullet-proof and stab-resistant performances after combination with aramid fiber.

Further, in the second adhesive, a mass ratio of waterborne polyurethane, waterborne epoxy resin, methyl methacrylate, ethylene glycol, N-methyl diethanolamine and titanate coupling agent is 700:(200-250):(100-200):(30-50):(10-30):(3-5).

The weaving process of the second aramid unidirectional cloth may refer to that of the first aramid unidirectional cloth, and the difference is that after the weaving of the second aramid unidirectional cloth is completed, the obtained second aramid unidirectional cloth needs to be subjected to hot-pressing treatment, where a hot-pressing temperature is 150-170° C., a hot-pressing pressure is 2-3 MPa, and a hot-pressing time is 15-20 min. In the hot-pressing treatment process, the second adhesive is heated and then subjected to secondary curing, so that the adhesive solution is better bonded with fiber, the fiber is more closely laid and is difficult to slide to both sides in the stab process of knife, thereby achieving better stab-resistant performance.

The third protection layer includes 5-12 layers of third aramid unidirectional cloth, that is, N3=5-12 layers, and a third adhesive is used in the weaving of the third aramid unidirectional cloth. The third adhesive includes waterborne polyurethane, aminomethyl silicone oil, ammonium polyphosphate and titanate coupling agent. Waterborne polyurethane is a basic component of the third adhesive. Aminomethyl silicone oil enhances the flexibility and levelling of the third adhesive, ammonium polyphosphate enhances the flame retardancy of the aramid unidirectional cloth, and titanate coupling agent activates various materials to ensure uniform mixing between the materials; and the stab-resistant performance of the third aramid unidirectional cloth is further enhanced through coordination between the materials.

Further, in the third adhesive, a mass ratio of waterborne polyurethane, aminomethyl silicone oil, ammonium polyphosphate and titanate coupling agent is 1000:(70-90):(10-20):(5-8).

The weaving process of the third aramid unidirectional cloth may refer to that of the second aramid unidirectional cloth.

Among the above three adhesives, waterborne polyurethane may be one of dispersion liquid or emulsion of the commercially available polyester polyurethane, polyether polyurethane. Further, a solid content of waterborne polyurethane is 30-50%. Lower solid content of waterborne polyurethane may affect the preparation of the adhesive and reduce the production efficiency, and higher solid content of waterborne polyurethane may cause a cost loss.

In consideration of the protection performance and the wearing comfortability of the bullet-proof and stab-resistant suit, the total number of layers of the first aramid unidirectional cloth, the second aramid unidirectional cloth and the third aramid unidirectional cloth is 20-40 layers, that is, N1+N2+N3=20-40 layers.

The buffer layer 4 is disposed between the protection layers and the protected individual, has the characteristics of light weight, softness and comfort for wearing, and can be obtained according to the conventional technical means in the art. In particular, the buffer layer 4 is a polymer foam board, for example, one of an ethylene-vinyl acetate copolymer foam board, a polyvinyl chloride foam board and a polyethylene terephthalate foam board.

Further, in consideration of the wearing comfortability of the bullet-proof and stab-resistant suit, a thickness of the buffer layer is 1-3 mm.

In the preparation process, the first protection layer 1, the second protection layer 2, the third protection layer 3 and the buffer layer 4 are sequentially stacked and assembled in an order shown in FIG. 1 to obtain a protection core sheet. However, considering the integrity of the protection core sheet, in the present application, the protection layers and the buffer layer are each packaged by using a thermally bonded cloth. Specifically, the protection core sheet further includes a thermally bonded cloth for wrapping and sealing the protection core sheet, and the thermally bonded cloth may be obtained by using conventional technical means in the art. In the preparation process, each protection layer and the buffer layer are completely wrapped by the thermally bonded cloth, and the protection layers and the buffer layer are packaged by using a heat sealing device, so as to achieve a sealing effect.

In conclusion, the bullet-proof and stab-resistant suit provided in the present application has better response protection characteristics in the process of bullet penetration or knife tip stab, and the prepared aramid unidirectional cloth has low areal density, apparent flatness, no bubbles, and excellent softness, so that any bending within 180° can be realized. Therefore, the bullet-proof and stab-resistant suit provided in the present application can meet the protection requirements while reducing the weight of the bullet-proof and stab-resistant suit, and improve the softness and wearing comfortability of the bullet-proof and stab-resistant suit.

A second aspect of the present application provides a preparation method of any one of the above bullet-proof and stab-resistant suits, including following the steps:

mixing waterborne polyurethane, 1,4-butanediol, methyltrimethoxysilane, methyltrichlorosilane, dicyandiamide and nano-montmorillonite, and stirring evenly to obtain a first adhesive, injecting the first adhesive into an adhesive cartridge of a loom, and weaving with a first aramid fiber to obtain a first aramid unidirectional cloth; and laminating 5-15 layers of the first aramid unidirectional cloth to obtain a first protection layer;

mixing waterborne polyurethane, waterborne epoxy resin, methyl methacrylate, ethylene glycol, N-methyl diethanolamine and titanate coupling agent, and stirring evenly to obtain a second adhesive, injecting the second adhesive into the adhesive cartridge of the loom, weaving with a second aramid fiber to obtain a second aramid unidirectional cloth, hot pressing the second aramid unidirectional cloth, and laminating 10-25 layers of second aramid unidirectional cloth to obtain a second protection layer;

mixing waterborne polyurethane, aminomethyl silicone oil, ammonium polyphosphate and titanate coupling agent and stirring evenly to obtain a third adhesive, injecting the third adhesive into the adhesive cartridge of the loom, weaving with a third aramid fiber to obtain a third aramid unidirectional cloth, hot pressing the third aramid unidirectional cloth, and laminating 5-12 layers of third aramid unidirectional cloth to obtain a third protection layer; and stacking the first protection layer, the second protection layer, the third protection layer and the buffer layer sequentially to obtain a protection core sheet, and placing the protection core sheet in a sheath to obtain the bullet-proof and stab-resistant suit.

In a specific embodiment, firstly, an adhesive is prepared. In the preparation process of the adhesive, the materials used are as described above, and the mixing process may be performed in two steps, the details are as follows.

In a process of preparing the first adhesive, waterborne polyurethane, 1,4-butanediol, methyltrimethoxysilane and methyltrichlorosilane are firstly mixed according to the above mass ratio, and uniformly stirred in a mechanical stirring manner, in the process of stirring, the rotational speed is set to 500-700 r/min and the stirring time is set to 30-50 min; after the stirring is completed, dicyandiamide and nano-montmorillonite are added, and the mechanical stirring is continued under a rotational speed of 800-1000 r/min for 100-120 min; after the stirring is completed, the first adhesive is obtained.

In a process of preparing the second adhesive, ethylene glycol, N-methyl diethanolamine and titanate coupling agent are firstly mixed according to the above mass ratio; waterborne polyurethane, waterborne epoxy resin and methyl methacrylate are mixed according to the above mass ratio; then the two mixed solution are mixed and the mechanical stirring is continued under a stirring speed of 800-1000 r/min for 60-90 min; after the stirring is completed, the second adhesive is obtained.

In a process of preparing the third adhesive, waterborne polyurethane, aminomethyl silicone oil and titanate coupling agent are firstly mixed according to the above mass ratio and stirred mechanically under a rotational speed of 300-500 r/min for 10-20 min; after the stirring is completed, ammonium polyphosphate is added, the mechanical stirring is continued under a stirring rotational speed of 800-1000 r/min for 50-80 min; after the stirring is completed, the third adhesive is obtained.

By the above preparation method, it can be ensured that respective materials are uniformly mixed to achieve excellent modification effect on waterborne polyurethane, so that the prepared adhesive can be well combined with aramid fiber to realize excellent protection performance.

Secondly, the prepared first adhesive, the prepared second adhesive and the prepared third adhesive are respectively added to the adhesive cartridge of the loom, and the first aramid unidirectional cloth, the second aramid unidirectional cloth and the third aramid unidirectional cloth are prepared by using aramid fiber in combination with different adhesives, and then the first aramid unidirectional cloth, the second aramid unidirectional cloth and the third aramid unidirectional cloth may be cut to meet the wearing requirements of the protected individual.

After the cutting is completed, the second aramid unidirectional cloth and the third aramid unidirectional cloth need to be subjected to a hot pressing treatment so that the second adhesive and the third adhesive are underwent secondary curing to achieve better adhesion between the adhesive solution and the fiber and improve the stab-resistant performance. Specifically, the hot-pressing temperature is 150-170° C., the hot-pressing pressure is 2-3 MPa, and the hot-pressing time is 15-20 min.

Finally, according to the requirements of the number of layers provided in the first aspect of the present application, the first aramid unidirectional cloth, the second aramid unidirectional cloth and the third aramid unidirectional cloth are laminated to obtain a first protection layer, a second protection layer, and a third protection layer, respectively; and then the first protection layer, the second protection layer, and the third protection layer, in combination with the buffer layer, are sequentially laminated to obtain the protection core sheet.

In addition, the protection core sheet may be sealed, specifically, the protection core sheet formed by lamination is wrapped with a thermally bonded cloth and is hot-sealed, so that the protection core sheet is sealed inside the thermally bonded cloth, and finally, the sealed protection core sheet is put into a sheath to obtain the bullet-proof and stab-resistant suit.

The preparation method provided in the present application is characterized in that the raw materials used are low in cost, the preparation process is simple, there is no need to modify the original production device, only but to replace the adhesive, the preparation process is suitable for industrial pipelining-operation, and pollutants such as three wastes are not generated in the preparation process, which meets the production requirements of environmental protection, and has significant economic and social benefits.

The implementations of the present application have at least the following advantages.

1. The bullet-proof and stab-resistant suit provided in the present application has better response protection characteristics in the process of bullet penetration or knife tip stab, and the prepared aramid unidirectional cloth has low areal density, apparent flatness, no bubbles, and excellent softness, so that any bending within 180° can be realized. Therefore, the bullet-proof and stab-resistant suit provided in the present application can meet the protection requirements while reducing the weight of the bullet-proof and stab-resistant suit, and improve the softness and wearing comfortability of the bullet-proof and stab-resistant suit.
2. The preparation method provided in the present application is characterized in that the raw materials used are low in cost, the preparation process is simple, there is no need to modify the original production device, only but to replace the adhesive, the preparation process is suitable for industrial pipelining operation, and pollutants such as three wastes are not generated in the preparation process, which meets the production requirements of environmental protection, and has significant economic and social benefits.

BRIEF DESCRIPTION OF DRAWINGS

In order to describe the technical solutions of the embodiments of the present application more clearly, the drawings required to be used in embodiments of the present application will be briefly described below. Obviously, the drawings described below are merely some embodiments of the present application, and other drawings may be obtained from the drawings without creative effort by those ordinary skilled in the art.

FIG. 1 is a structural schematic diagram of a protection core sheet according to an embodiment of the present application.

DESCRIPTION OF REFERENCE NUMBERS

1—first protection layer;
2—second protection layer;
3—third protection layer;
4—buffer layer.

DETAILED DESCRIPTION

In order to make the objectives, technical solutions and advantages of the embodiments of the present application clearer, the technical solutions in the embodiments of the present application will be described clearly and completely below. Obviously, the described embodiments are some but not all of the embodiments of the present application. Based on the embodiments of the present application, all other embodiments obtained by those of ordinary skill in the art without creative effort shall fall within the scope of the protection of the present application.

The materials used in the following examples are all commercially available products, and specific information are shown in Table 1:

TABLE 1

| No. | Raw materials | Manufacturer |
|---|---|---|
| 1 | Aramid fiber | Dutch Akzo Company |
| 2 | Waterborne polyurethane | Wanhua ChemicalGroup Co., Ltd. |
| 3 | 1,4-butanediol | Shanghai Makclin Biochemical Co., Ltd. |
| 4 | Methyltrimethoxysilane | Shanghai Makclin Biochemical Co., Ltd. |
| 5 | Methyltrichlorosilane | Shanghai Makclin Biochemical Co., Ltd. |
| 6 | Dicyandiamide | Weixing Chemical Co., Ltd. |
| 7 | Nano-montmorillonite | Jiangxi Gukang New Material Co., Ltd. |
| 8 | Methyl methacrylate | Shanghai Makclin Biochemical Co., Ltd. |
| 9 | Ethylene glycol | Shanghai Makclin Biochemical Co., Ltd. |
| 10 | N-methyl diethanolamine | Shanghai Makclin Biochemical Co., Ltd. |
| 11 | titanate coupling agent | Changsha Luosi Tech Co., Ltd. |
| 12 | Aminomethyl silicone oil | Shanghai Makclin Biochemical Co., Ltd. |
| 13 | Ammonium polyphosphate | Changfeng Chemical Co., Ltd. |

Example 1

The preparation method of the bullet-proof and stab-resistant suit provided in this example includes the following steps:

Step 1: mixing 2,000 parts of waterborne polyurethane, 150 parts of 1,4-butanediol, 16 parts of methyltrimethoxysilane and 28 parts of methyltrichlorosilane, mechanically stirring at a rotational speed of 650 r/min for 34 min, adding 21 parts of dicyandiamide and 13 parts of nano-montmorillonite, continuing to stir mechanically at a rotational speed of 960 r/min for 105 min, and obtaining a first adhesive;

mixing 80 parts of ethylene glycol, 35 parts of N-methyl diethanolamine and 8 parts of titanate coupling agent, and mechanically stirring at a rotational speed of 220 r/min for 18 min, mixing 1400 parts of waterborne polyurethane, 420 parts of waterborne epoxy resin and 370 parts of methyl methacrylate, mixing the two mixed solution and then mechanically stirring at a rotational speed of 830 r/min for 80 min, and obtaining a second adhesive;

mixing 2,000 parts of waterborne polyurethane, 170 parts of aminomethyl silicone oil, and 12 parts of titanate coupling agent, mechanically stirring at a rotational speed of 430 r/min for 16 min, adding 38 parts of ammonium polyphosphate, continuing to stir mechanically at a rotational speed of 860 r/min for 75 min, and obtaining a third adhesive.

Step 2: injecting the first adhesive, the second adhesive and the third adhesive into an adhesive cartridge of a loom, and weaving a unidirectional cloth with aramid fiber to obtain a first aramid unidirectional cloth, a second aramid unidirectional cloth and a third aramid unidirectional cloth, respectively;

cutting the first aramid unidirectional cloth, the second aramid unidirectional cloth, the third aramid unidirectional cloth and a PVC (Polyvinyl chloride) buffer foam board with a thickness of 2 mm by using a full-automatic cutting machine separately, and then hot-pressing the second aramid unidirectional cloth and the third aramid unidirectional cloth separately under a hot-pressing temperature of 165° C. and a pressure of 2.2 MPa for 18 min.

Step 3: laminating and combining 5 layers of first aramid unidirectional cloth, 12 layers of second aramid unidirectional cloth and 6 layers of third aramid unidirectional cloth, respectively, to obtain a first protection layer, a second protection layer, and a third protection layer, and placing them in an order of the first protection layer→the second protection layer→the third protection layer→the buffer layer to obtain an inner core of a protection core sheet;

hermetically packaging the inner core of the protection core sheet with a thermally bonded cloth, and marking a close-fitting surface on a surface of the packaged thermally bonded cloth close to the buffer layer, thereby obtaining a protection core sheet.

Step 4: placing the protection core sheet into a sheath, and ensuring that the close-fitting surface is disposed on the inside, thereby obtaining the bullet-proof and stab-resistant suit.

Example 2

A preparation method of the bullet-proof and stab-resistant suit provided in this example includes the following steps.

Step 1: mixing 1,500 parts of waterborne polyurethane, 100 parts of 1,4-butanediol, 12 parts of methyltrimethoxysilane and 20 parts of methyltrichlorosilane, mechanically stirring at a rotational speed of 520 r/min for 45 min, adding 15 parts of dicyandiamide and 9 parts of nano-montmorillonite, continuing to stir mechanically at a rotational speed of 880 r/min for 120 min, and obtaining a first adhesive;

mixing 65 parts of ethylene glycol, 42 parts of N-methyl diethanolamine and 6 parts of titanate coupling agent, and mechanically stirring at a rotational speed of 260 r/min for 14 min, mixing 1050 parts of waterborne polyurethane, 350 parts of waterborne epoxy resin and 200 parts of methyl methacrylate, mixing the two mixed solution and then mechanically stirring at a rotational speed of 910 r/min for 75 min, and obtaining a second adhesive;

mixing 1,500 parts of waterborne polyurethane, 110 parts of aminomethyl silicone oil, and 9 parts of titanate coupling agent, mechanically stirring at a rotational speed of 380 r/min for 18 min, adding 22 parts of ammonium polyphosphate, continuing to stir mechanically at a rotational speed of 1000 r/min for 55 min, and obtaining a third adhesive.

Step 2: injecting a first adhesive, a second adhesive, and a third adhesive into an adhesive cartridge of a loom, and weaving a unidirectional cloth with aramid fiber to obtain a first aramid unidirectional cloth, a second aramid unidirectional cloth and a third aramid unidirectional cloth, respectively;

cutting the first aramid unidirectional cloth, the second aramid unidirectional cloth, the third aramid unidirectional cloth and a EVA (Ethylene-vinyl acetate copolymer) buffer foam board with a thickness of 3 mm by using a full-automatic cutting machine separately, and then hot-pressing the second aramid unidirectional cloth and the third aramid unidirectional cloth separately under a hot-pressing temperature of 155° C. and a pressure of 2.5 MPa for 16 min.

Step 3: laminating and combining 7 layers of first aramid unidirectional cloth, 16 layers of second aramid unidirectional cloth and 5 layers of third aramid unidirectional cloth, respectively, to obtain a first protection layer, a second protection layer, and a third protection layer, and placing them in an order of the first protection layer→the second protection layer→the third protection layer→the buffer layer to obtain an inner core of a protection core sheet;

hermetically packaging the inner core of the protection core sheet with a thermally bonded cloth, and marking a close-fitting surface on a surface of the packaged thermally bonded cloth close to the buffer layer, thereby obtaining a protection core sheet.

Step 4: placing the protection core sheet into a sheath, and ensuring that the close-fitting surface is disposed on the inside, thereby obtaining the bullet-proof and stab-resistant suit.

Example 3

The preparation method of the bullet-proof and stab-resistant suit provided in this example includes the following steps.

Step 1: mixing 3,000 parts of waterborne polyurethane, 190 parts of 1,4-butanediol, 27 parts of methyltrimethoxysilane and 41 parts of methyltrichlorosilane, mechanically stirring at a rotational speed of 580 r/min for 42 min, adding 35 parts of dicyandiamide and 17 parts of nano-montmorillonite, continuing to stir mechanically at a rotational speed of 900 r/min for 115 min, and obtaining a first adhesive;

mixing 120 parts of ethylene glycol, 65 parts of N-methyl diethanolamine and 13 parts of titanate coupling agent, and mechanically stirring at a rotational speed of 240 r/min for 16 min, mixing 2,100 parts of waterborne polyurethane, 680 parts of waterborne epoxy resin and 430 parts of methyl methacrylate, mixing the two mixed solution and then mechanically stirring at a rotational speed of 870 r/min for 85 min, and obtaining a second adhesive;

mixing 3,000 parts of waterborne polyurethane, 240 parts of aminomethyl silicone oil, and 18 parts of titanate coupling agent, mechanically stirring at a rotational speed of 460 r/min for 15 min, adding 53 parts of ammonium polyphosphate, continuing to stir mechanically at a rotational speed of 940 r/min for 68 min, and obtaining a third adhesive.

Step 2: injecting the first adhesive, the second adhesive and the third adhesive into an adhesive cartridge of a loom, and weaving a unidirectional cloth with aramid fiber to obtain a first aramid unidirectional cloth, a second aramid unidirectional cloth and a third aramid unidirectional cloth, respectively;

cutting the first aramid unidirectional cloth, the second aramid unidirectional cloth, the third aramid unidirectional cloth and a PET (Polyethylene glycol terephthalate) buffer foam board with a thickness of 1 mm by using a full-automatic cutting machine separately, and then hot-pressing the second aramid unidirectional cloth and the third aramid unidirectional cloth separately under a hot-pressing temperature of 160° C. and a pressure of 2.4 MPa for 17 min.

Step 3: laminating and combining 12 layers of first aramid unidirectional cloth, 15 layers of second aramid unidirectional cloth and 10 layers of third aramid unidirectional cloth, respectively, to obtain a first protection layer, a second protection layer, and a third protection layer, and placing them in an order of the first protection layer→the second protection layer→the third protection layer→the buffer layer to obtain an inner core of a protection core sheet;

hermetically packaging the inner core of the protection core sheet with a thermally bonded cloth, and marking a close-fitting surface on a surface of the thermally bonded cloth close to the buffer layer, thereby obtaining a protection core sheet.

Step 4: placing the protection core sheet into a sheath, and ensuring that the close-fitting surface is disposed on the inside, thereby obtaining the bullet-proof and stab-resistant suit.

Example 4

The preparation method of the bullet-proof and stab-resistant suit provided in this example includes the following steps.

Step 1: mixing 2,200 parts of waterborne polyurethane, 170 parts of 1,4-butanediol, 18 parts of methyltrimethoxysilane and 27 parts of methyltrichlorosilane, mechanically stirring at a rotational speed of 670 r/min for 35 min, adding 19 parts of dicyandiamide and 14 parts of nano-montmorillonite, continuing to stir mechanically at a rotational speed of 950 r/min for 110 min, and obtaining a first adhesive;

mixing 90 parts of ethylene glycol, 58 parts of N-methyldiethanolamine and 9 parts of titanate coupling agent, and mechanically stirring at a rotational speed of 250 r/min for 15 min, mixing 1,540 parts of waterborne polyurethane, 520 parts of waterborne epoxy resin and 350 parts of methyl methacrylate, mixing the two mixed solution and then mechanically stirring at a rotational speed of 930 r/min for 70 min, and obtaining a second adhesive;

mixing 2,200 parts of waterborne polyurethane, 165 parts of aminomethyl silicone oil, and 15 parts of titanate coupling agent, mechanically stirring at a rotational speed of 420 r/min for 13 min, adding 37 parts of ammonium polyphosphate, continuing to stir mechanically at a rotational speed of 980 r/min for 76 min, and obtaining a third adhesive.

Step 2: injecting the first adhesive, the second adhesive and the third adhesive into an adhesive cartridge of a loom, and weaving a unidirectional cloth with aramid fiber to obtain a first aramid unidirectional cloth, a second aramid unidirectional cloth and a third aramid unidirectional cloth, respectively;

cutting the first aramid unidirectional cloth, the second aramid unidirectional cloth, the third aramid unidirectional cloth and a EVA buffer foam board with a thickness of 2 mm by using a full-automatic cutting machine separately, and then hot-pressing the second aramid unidirectional cloth and the third aramid unidirectional cloth separately under a hot-pressing temperature of 150° C. and a pressure of 2.7 MPa for 15 min.

Step 3: laminating and combining 6 layers of first aramid unidirectional cloth, 17 layers of second aramid unidirectional cloth and 7 layers of third aramid unidirectional cloth, respectively, to obtain a first protection layer, a second protection layer, and a third protection layer, and placing them in an order of the first protection layer→the second protection layer→the third protection layer→the buffer layer to obtain an inner core of a protection core sheet;

hermetically packaging the inner core of the protection core sheet with a thermally bonded cloth, and marking a close-fitting surface on a surface of the packaged thermally bonded cloth close to the buffer layer, thereby obtaining a protection core sheet.

Step 4: placing the protection core sheet into a sheath, and ensuring that the close-fitting surface is disposed on the inside, thereby obtaining the bullet-proof and stab-resistant suit.

Example 5

The preparation method of the bullet-proof and stab-resistant suit provided in this example includes the following steps.

Step 1: mixing 2,500 parts of waterborne polyurethane, 180 parts of 1,4-butanediol, 23 parts of methyltrimethoxysilane and 36 parts of methyltrichlorosilane, mechanically stirring at a rotational speed of 600 r/min for 40 min, adding 26 parts of dicyandiamide and 15 parts of nano-montmorillonite, continuing to stir mechanically at a rotational speed of 920 r/min for 100 min, and obtaining a first adhesive;

mixing 100 parts of ethylene glycol, 60 parts of N-methyl diethanolamine and 11 parts of titanate coupling agent, and mechanically stirring at a rotational speed of 280 r/min for 12 min, mixing 1,750 parts of waterborne polyurethane, 570 parts of waterborne epoxy resin and 460 parts of methyl methacrylate, mixing the two mixed solution and then mechanically stirring at a rotational speed of 970 r/min for 65 min, and obtaining a second adhesive;

mixing 2,500 parts of waterborne polyurethane, 180 parts of aminomethyl silicone oil, and 20 parts of titanate coupling agent, mechanically stirring at a rotational speed of 350 r/min for 20 min, adding 45 parts of ammonium polyphosphate, continuing to stir mechanically at a rotational speed of 890 r/min for 70 min, and obtaining a third adhesive.

Step 2: injecting the first adhesive, the second adhesive and the third adhesive into an adhesive cartridge of a loom, and weaving a unidirectional cloth with aramid fiber to obtain a first aramid unidirectional cloth, a second aramid unidirectional cloth and a third aramid unidirectional cloth, respectively;

cutting the first aramid unidirectional cloth, the second aramid unidirectional cloth, the third aramid unidirectional cloth and a PVC buffer foam board with a thickness of 3 mm by using a full-automatic cutting machine separately, and then hot-pressing the second aramid unidirectional cloth and the third aramid unidirectional cloth separately under a hot-pressing temperature of 170° C. and a pressure of 2.3 MPa for 20 min.

Step 3: laminating and combining 8 layers of first aramid unidirectional cloth, 20 layers of second aramid unidirectional cloth and 7 layers of third aramid unidirectional cloth, respectively, to obtain a first protection layer, a second protection layer, and a third protection layer, and placing them in an order of the first protection layer→the second protection layer→the third protection layer→the buffer layer to obtain an inner core of a protection core sheet;

hermetically packaging the inner core of the protection core sheet with a thermally bonded cloth, and marking a close-fitting surface on a surface of the packaged thermally bonded cloth close to the buffer layer, thereby obtaining a protection core sheet.

Step 4: placing the protection core sheet into a sheath, and ensuring that the close-fitting surface is disposed on the inside, thereby obtaining the bullet-proof and stab-resistant suit.

Comparative Example 1

The preparation method of the bullet-proof and stab-resistant suit provided in this comparative example includes the following steps.

Step 1: mixing 2,000 parts of waterborne polyurethane, 150 parts of 1,4-butanediol, 16 parts of methyltrimethoxysilane and 28 parts of methyltrichlorosilane, mechanically stirring at a rotational speed of 650 r/min for 34 min, and obtaining a first adhesive;

mixing 80 parts of ethylene glycol, 35 parts of N-methyl diethanolamine and 8 parts of titanate coupling agent, and mechanically stirring at a rotational speed of 220 r/min for 18 min, mixing 1,400 parts of waterborne polyurethane, 420 parts of waterborne epoxy resin and 370 parts of methyl methacrylate, mixing the two mixed solution and then mechanically stirring at a rotational speed of 830 r/min for 80 min, and obtaining a second adhesive;

mixing 2,000 parts of waterborne polyurethane, 170 parts of aminomethyl silicone oil, and 12 parts of titanate coupling agent, mechanically stirring at a rotational speed of 430 r/min for 16 min, adding 38 parts of ammonium polyphosphate, continuing to stir mechanically at a rotational speed of 860 r/min for 75 min, and obtaining a third adhesive.

Step 2: injecting the first adhesive, the second adhesive and the third adhesive into an adhesive cartridge of a loom, and weaving a unidirectional cloth with aramid fiber to obtain a first aramid unidirectional cloth, a second aramid unidirectional cloth and a third aramid unidirectional cloth, respectively;

cutting the first aramid unidirectional cloth, the second aramid unidirectional cloth, the third aramid unidirectional cloth and a PVC buffer foam board with a thickness of 2 mm by using a full-automatic cutting machine separately, and then hot-pressing the second aramid unidirectional cloth and the third aramid unidirectional cloth separately under a hot-pressing temperature of 165° C. and a pressure of 2.2 MPa for 18 min.

Step 3: laminating and combining 5 layers of first aramid unidirectional cloth, 12 layers of second aramid unidirectional cloth and 6 layers of third aramid unidirectional cloth, respectively, to obtain a first protection layer, a second protection layer, and a third protection layer, and placing them in an order of the first protection layer→the second protection layer→the third protection layer→the buffer layer to obtain an inner core of a protection core sheet;

hermetically packaging the inner core of the protection core sheet with a thermally bonded cloth, and marking a close-fitting surface on a surface of the packaged thermally bonded cloth close to the buffer layer thereby obtaining a protection core sheet.

Step 4: placing the protection core sheet into a sheath, and ensuring that the close-fitting surface is on the inside, thereby obtaining the bullet-proof and stab-resistant suit.

Comparative Example 2

The preparation method of the bullet-proof and stab-resistant suit provided in this comparative example includes the following steps.

Step 1: mixing 1,500 parts of waterborne polyurethane, 100 parts of 1,4-butanediol, 12 parts of methyltrimethoxysilane and 20 parts of methyltrichlorosilane, mechanically stirring at a rotational speed of 520 r/min for 45 min, adding 15 parts of dicyandiamide and 9 parts of nano-montmorillonite, continuing to stir mechanically at a rotational speed of 880 r/min for 120 min, and obtaining a first adhesive;

mixing 65 parts of ethylene glycol, 42 parts of N-methyl diethanolamine and 6 parts of titanate coupling agent, and mechanically stirring at a rotational speed of 260 r/min for 14 min, mixing 1,050 parts of waterborne polyurethane and 200 parts of methyl methacrylate, mixing the two mixed solution and then mechanically stirring at a rotational speed of 910 r/min for 75 min, and obtaining a second adhesive;

mixing 1,500 parts of waterborne polyurethane, 110 parts of aminomethyl silicone oil, and 9 parts of titanate coupling agent, mechanically stirring at a rotational speed of 380 r/min for 18 min, adding 22 parts of ammonium polyphosphate, continuing to stir mechanically at a rotational speed of 1000 r/min for 55 min, and obtaining a third adhesive.

Step 2: injecting a first adhesive, a second adhesive, and a third adhesive into an adhesive cartridge of a loom, and weaving a unidirectional cloth with aramid fiber to obtain a first aramid unidirectional cloth, a second aramid unidirectional cloth and a third aramid unidirectional cloth, respectively;

cutting the first aramid unidirectional cloth, the second aramid unidirectional cloth, the third aramid unidirectional cloth and a EVA buffer foam board with a thickness of 3 mm by using a full-automatic cutting machine separately, and then hot-pressing the second aramid unidirectional cloth and the third aramid unidirectional cloth separately under a hot-pressing temperature of 155° C. and a pressure of 2.5 MPa for 16 min.

Step 3: laminating and combining 7 layers of first aramid unidirectional cloth, 16 layers of second aramid unidirectional cloth and 5 layers of third aramid unidirectional cloth, respectively, to obtain a first protection layer, a second protection layer, and a third protection layer, and placing them in an order of the first protection layer→the second protection layer→the third protection layer→the buffer layer to obtain an inner core of a protection core sheet;

hermetically packaging the inner core of the protection core sheet with a thermally bonded cloth, and marking a close-fitting surface on a surface of the packaged thermally bonded cloth close to the buffer layer, thereby obtaining a protection core sheet.

Step 4: placing the protection core sheet into a sheath, and ensuring that the close-fitting surface is disposed on the inside, thereby obtaining the bullet-proof and stab-resistant suit.

Comparative Example 3

The preparation method of the bullet-proof and stab-resistant suit provided in this comparative example includes the following steps.

Step 1: mixing 3,000 parts of waterborne polyurethane, 190 parts of 1,4-butanediol, 27 parts of methyltrimethoxysilane and 41 parts of methyltrichlorosilane, mechanically stirring at a rotational speed of 580 r/min for 42 min, adding 35 parts of dicyandiamide and 17 parts of nano-montmorillonite, continuing to stir mechanically at a rotational speed of 900 r/min for 115 min, and obtaining a first adhesive;

mixing 120 parts of ethylene glycol, 65 parts of N-methyl diethanolamine and 13 parts of titanate coupling agent, and mechanically stirring at a rotational speed of 240 r/min for 16 min, mixing 2,100 parts of waterborne polyurethane, 680 parts of waterborne epoxy resin and 430 parts of methyl methacrylate, mixing the two mixed solution and then mechanically stirring at a rotational speed of 870 r/min for 85 min, and obtaining a second adhesive;

mixing 3,000 parts of waterborne polyurethane and 53 parts of ammonium polyphosphate, mechanically stirring at a rotational speed of 940 r/min for 68 min, and obtaining a third adhesive.

Step 2: injecting the first adhesive, the second adhesive and the third adhesive into an adhesive cartridge of a loom, and weaving a unidirectional cloth with aramid fiber to obtain a first aramid unidirectional cloth, a second aramid unidirectional cloth and a third aramid unidirectional cloth, respectively;

cutting the first aramid unidirectional cloth, the second aramid unidirectional cloth, the third aramid unidirectional cloth and a PET buffer foam board with a thickness of 1 mm by using a full-automatic cutting machine separately, and then hot-pressing the second aramid unidirectional cloth and the third aramid unidirectional cloth separately under a hot-pressing temperature of 160° C. and a pressure of 2.4 MPa for 17 min.

Step 3: laminating and combining 12 layers of first aramid unidirectional cloth, 15 layers of second aramid unidirectional cloth and 10 layers of third aramid unidirectional cloth, respectively, to obtain a first protection layer, a second protection layer, and a third protection layer, and placing them in an order of the first protection layer→the second protection layer→the third protection layer→the buffer layer to obtain an inner core of a protection core sheet;

hermetically packaging the inner core of the protection core sheet with a thermally bonded cloth, and marking a close-fitting surface on a surface of the packaged thermally bonded cloth close to the buffer layer, thereby obtaining a protection core sheet.

Step 4: placing the protection core sheet into a sheath, and ensuring that the close-fitting surface is disposed on the inside, thereby obtaining the bullet-proof and stab-resistant suit.

Comparative Example 4

The preparation method of the bullet-proof and stab-resistant suit provided in this comparative example includes the following steps.

Step 1: mixing 2,200 parts of waterborne polyurethane, 170 parts of 1,4-butanediol, 18 parts of methyltrimethoxysilane and 27 parts of methyltrichlorosilane, mechanically stirring at a rotational speed of 670 r/min for 35 min, adding 19 parts of dicyandiamide and 14 parts of nano-montmorillonite, continuing to stir mechanically at a rotational speed of 950 r/min for 110 min, and obtaining a first adhesive;

mixing 90 parts of ethylene glycol, 58 parts of N-methyl diethanolamine and 9 parts of titanate coupling agent, and mechanically stirring at a rotational speed of 250 r/min for 15 min, mixing 1,540 parts of waterborne polyurethane, 520 parts of waterborne epoxy resin and 350 parts of methyl methacrylate, mixing the two mixed solution and then mechanically stirring at a rotational speed of 930 r/min for 70 min, and obtaining a second adhesive;

mixing 2,200 parts of waterborne polyurethane, 165 parts of aminomethyl silicone oil and 15 parts of titanate coupling agent, mechanically stirring at a rotational speed of 420 r/min for 13 min, adding 37 parts of ammonium polyphosphate, continuing to stir mechanically at a rotational speed of 980 r/min for 76 min, and obtaining a third adhesive.

Step 2: injecting the first adhesive, the second adhesive and the third adhesive into an adhesive cartridge of a loom, and weaving a unidirectional cloth with aramid fiber to obtain a first aramid unidirectional cloth, a second aramid unidirectional cloth and a third aramid unidirectional cloth, respectively;

cutting the first aramid unidirectional cloth, the second aramid unidirectional cloth, the third aramid unidirectional cloth and a EVA buffer foam board with a thickness of 2 mm by using a full-automatic cutting machine separately, and then hot-pressing the second aramid unidirectional cloth and the third aramid unidirectional cloth separately under a hot-pressing temperature of 150° C. and a pressure of 2.7 MPa for 15 min.

Step 3: laminating and combining 2 layers of first aramid unidirectional cloth, 25 layers of second aramid unidirectional cloth and 3 layers of third aramid unidirectional cloth, respectively, to obtain a first protection layer, a second protection layer, and a third protection layer, and placing them in an order of the first protection layer→the second protection layer→the third protection layer→the buffer layer to obtain an inner core of a protection core sheet;

hermetically packaging the inner core of the protection core sheet with a thermally bonded cloth, and marking a close-fitting surface on a surface of the packaged thermally bonded cloth close to the buffer layer, thereby obtaining a protection core sheet.

Step 4: placing the protection core sheet into a sheath, and ensuring that the close-fitting surface is disposed on the inside, thereby obtaining the bullet-proof and stab-resistant suit.

Comparative Example 5

The preparation method of the bullet-proof and stab-resistant suit provided in this comparative example includes the following steps.

Step 1: mixing 2,500 parts of waterborne polyurethane, 180 parts of 1,4-butanediol, 23 parts of methyltrimethoxysilane and 36 parts of methyltrichlorosilane, mechanically stirring at a rotational speed of 600 r/min for 40 min, adding 26 parts of dicyandiamide and 15 parts of nano-montmorillonite, continuing to stir mechanically at a rotational speed of 920 r/min for 100 min, and obtaining a first adhesive;

mixing 100 parts of ethylene glycol, 60 parts of N-methyl diethanolamine and 11 parts of titanate coupling agent, and mechanically stirring at a rotational speed of 280 r/min for 12 min, mixing 1,750 parts of waterborne polyurethane, 570 parts of waterborne epoxy resin and 460 parts of methyl methacrylate, mixing the two mixed solution and then mechanically stirring at a rotational speed of 970 r/min for 65 min, and obtaining a second adhesive;

mixing 2,500 parts of waterborne polyurethane, 180 parts of aminomethyl silicone oil, and 20 parts of titanate coupling agent, mechanically stirring at a rotational speed of 350 r/min for 20 min, adding 45 parts of ammonium polyphosphate, continuing to stir mechanically at a rotational speed of 890 r/min for 70 min, and obtaining a third adhesive.

Step 2: injecting the first adhesive, the second adhesive and the third adhesive into an adhesive cartridge of a loom, and weaving a unidirectional cloth with aramid fiber to obtain a first aramid unidirectional cloth, a second aramid unidirectional cloth and a third aramid unidirectional cloth, respectively;

cutting the first aramid unidirectional cloth, the second aramid unidirectional cloth, the third aramid unidirectional cloth and a PVC buffer foam board with a thickness of 3 mm by using a full-automatic cutting machine separately, and then hot-pressing the second aramid unidirectional cloth and the third aramid unidirectional cloth separately under a hot-pressing temperature of 100° C. and a pressure of 4 MPa for 20 min.

Step 3: laminating and combining 8 layers of first aramid unidirectional cloth, 20 layers of second aramid unidirectional cloth and 7 layers of third aramid unidirectional cloth, respectively, to obtain a first protection layer, a second protection layer, and a third protection layer, and placing them in an order of the first protection layer→the second protection layer→the third protection layer→the buffer layer to obtain an inner core of a protection core sheet;

hermetically packaging the inner core of the protection core sheet with a thermally bonded cloth, and marking a close-fitting surface on a surface of the packaged thermally bonded cloth close to the buffer layer, thereby obtaining a protection core sheet.

Step 4: placing the protection core sheet into a sheath, and ensuring that the close-fitting surface is disposed on the inside, thereby obtaining the bullet-proof and stab-resistant suit.

Comparative Example 6

The preparation method of the bullet-proof and stab-resistant suit provided in this comparative example includes the following steps.

Step 1: mixing 2,500 parts of waterborne polyurethane, 180 parts of 1,4-butanediol, 23 parts of methyltrimethoxysilane and 36 parts of methyltrichlorosilane, mechanically stirring at a rotational speed of 600 r/min for 40 min, adding 26 parts of dicyandiamide and 15 parts of nano-montmorillonite, continuing to stir mechanically at a rotational speed of 920 r/min for 100 min, and obtaining a first adhesive;

mixing 100 parts of ethylene glycol, 60 parts of N-methyl diethanolamine and 11 parts of titanate coupling agent, and mechanically stirring at a rotational speed of 280 r/min for 12 min, mixing 1750 parts of waterborne polyurethane, 570 parts of waterborne epoxy resin and 460 parts of methyl methacrylate, mixing the two mixed solution and then mechanically stirring at a rotational speed of 970 r/min for 65 min, and obtaining a second adhesive;

mixing 2,500 parts of waterborne polyurethane, 180 parts of aminomethyl silicone oil, and 20 parts of titanate coupling agent, mechanically stirring at a rotational speed of 350 r/min for 20 min, adding 45 parts of ammonium polyphosphate, continuing to stir mechanically at a rotational speed of 890 r/min for 70 min, and obtaining a third adhesive.

Step 2: injecting the first adhesive, the second adhesive and the third adhesive into an adhesive cartridge of a loom, and weaving a unidirectional cloth with aramid fiber to obtain a first aramid unidirectional cloth, a second aramid unidirectional cloth and a third aramid unidirectional cloth, respectively;

cutting the first aramid unidirectional cloth, the second aramid unidirectional cloth, the third aramid unidirectional cloth and a PVC buffer foam board with a thickness of 3 mm by using a full-automatic cutting machine separately, and then hot-pressing the second aramid unidirectional cloth and the third aramid unidirectional cloth separately under a hot-pressing temperature of 190° C. and a pressure of 2.6 MPa for 20 min.

Step 3: laminating and combining 8 layers of first aramid unidirectional cloth, 20 layers of second aramid unidirectional cloth and 7 layers of third aramid unidirectional cloth, respectively, to obtain a first protection layer, a second protection layer, and a third protection layer, and placing them in an order of the first protection layer→the second protection layer→the third protection layer→the buffer layer to obtain an inner core of a protection core sheet;

hermetically packaging the inner core of the protection core sheet with a thermally bonded cloth, and marking a close-fitting surface on a surface of the packaged thermally bonded cloth close to the buffer layer, thereby obtaining a protection core sheet.

Step 4: placing the protection core sheet into a sheath, and ensuring that the close-fitting surface is disposed on the inside, thereby obtaining the bullet-proof and stab-resistant suit.

Note: without special instructions, the first aramid unidirectional cloth, second aramid unidirectional cloth, third aramid unidirectional cloth and the buffer foam plates of the above embodiments are all cut in the M dimension of the KL version.

Bullet-proof and stab-resistant performance tests are performed on the bullet-proof and stab-resistant suits provided in Examples 1-5 and Comparative Examples 1-6. The stab-resistant performance test is conducted in strict accordance with a stab-resistant testing standard of NIJ 0115.00 Level I of U.S. Department of Justice, and the knife impact energy is 24 J (17.7 ft–1 bf). The bullet-proof performance test is conducted in strict accordance with a bullet-proof performance testing standard of NIJ 0101.06 Level IIIA of U.S. Department of Justice, using a Magnan half-armored hollow pointed bullet (0.44) with a calibrated mass of 15.6 g. The test results are shown in Table 2.

Table 2 Results of performance tests of bullet-proof and stab-resistant suit provided in Example 1-5 and Comparative Examples 1-6

| No. | Average single-layer areal density (g/m²) | Stab-resistant performance | Bullet-proof performance | | | Whether it satisfies arbitrary bending within 180° |
| --- | --- | --- | --- | --- | --- | --- |
| | | | Average bullet velocity (m/s) | Average number of penetration layer(layer) | Average depression (mm) | |
| Example 1 | 152.3 | Not penetrated | 438.3 | 10.2 | 3.3 | Yes |
| Example 2 | 149.7 | Not penetrated | 441.7 | 11.5 | 3.4 | Yes |
| Example 3 | 151.6 | Not penetrated | 437.6 | 9.8 | 2.8 | Yes |
| Example 4 | 150.8 | Not penetrated | 443.2 | 10.6 | 3.6 | Yes |
| Example 5 | 153.2 | Not penetrated | 437.7 | 9.2 | 3.2 | Yes |
| Comparative Example 1 | 147.6 | Not penetrated | 439.4 | 23.0 | — | Yes |
| Comparative Example 2 | 146.4 | Not penetrated | 440.2 | 27.5 | — | Yes |
| Comparative Example 3 | 143.8 | Penetrated | 438.8 | 10.8 | 2.4 | No |
| Comparative Example 4 | 145.9 | Penetrated | 441.3 | 30.0 | — | Yes |
| Comparative Example 5 | 149.5 | Penetrated | 442.2 | 12.7 | 6.8 | Yes |
| Comparative Example 6 | 148.7 | Penetrated | 440.8 | 13.2 | 7.2 | Yes |

Note: "-" represents that the penetration phenomenon exists in the bullet-proof performance test of sample pieces, and the depression value cannot be calculated.

It can be seen from Table 2 that the bullet-proof and stab-resistant suit provided in the present application has lower areal density and better softness. Meanwhile, the stab-resistant performance meets a stab-resistant testing standard of NIJ 0115.00 Level I of U.S. Department of Justice, and the bullet-proof performance meets a bullet-proof testing standard of N110101.06 Level IIIA of U.S. Department of Justice, and both are superior to the standards and the requirements of international market indicators. On the basis of meeting the bullet-proof and stab-resistant performances, light weight and softness are realized, which helps to improve wearing comfortability.

Finally, it should be noted that the above embodiments are merely used to describe the technical solutions of the present application and not to limit them; although the present application is described in detail with reference to the foregoing embodiments, those ordinary skilled in the art should understand that they may still make a modification on the technical solutions recorded in the foregoing embodiments or make an equivalent substitution on some or all of the technical features thereof; and these modifications or substitutions do not make the nature of the corresponding technical solutions deviate from the scope of the technical solutions of the embodiments of the present application.

What is claimed is:

1. A comfortable lightweight bullet-proof and stab-resistant suit, wherein the bullet-proof and stab-resistant suit comprises a sheath and a protection core sheet disposed in the sheath, and the protection core sheet comprises a first protection layer, a second protection layer, a third protection layer and a buffer layer which are sequentially stacked together;

the first protection layer comprises 5-15 layers of first aramid unidirectional cloth made from aramid fiber and a first adhesive, and the first adhesive comprises waterborne polyurethane, 1,4-butanediol, methyltrimethoxysilane, methyltrichlorosilane, dicyandiamide and nano-montmorillonite;

the second protection layer comprises 10-25 layers of second aramid unidirectional cloth made from aramid fiber and a second adhesive, and the second adhesive comprises waterborne polyurethane, waterborne epoxy resin, methyl methacrylate, ethylene glycol, N-methyl diethanolamine and titanate coupling agent; and the third protection layer comprises 5-12 layers of third aramid unidirectional cloth made from aramid fiber and a third adhesive, and the third adhesive comprises waterborne polyurethane, aminomethyl silicone oil, ammonium polyphosphate and titanate coupling agent.

2. The bullet-proof and stab-resistant suit according to claim 1, wherein in the first adhesive, a mass ratio of waterborne polyurethane, 1,4-butanediol, methyltrimethoxysilane, methyltrichlorosilane, dipolycyanamine and nano-montmorillonite is 1000:(60-80):(7-10):(10-15):(8-12):(5-7).

3. The bullet-proof and stab-resistant suit according to claim 1, wherein in the second adhesive, a mass ratio of waterborne polyurethane, waterborne epoxy resin, methyl methacrylate, ethylene glycol, N-methyl diethanolamine and titanate coupling agent is 700:(200-250):(100-200):(30-50):(10-30):(3-5).

4. The bullet-proof and stab-resistant suit according to claim 1, wherein in the third adhesive, a mass ratio of waterborne polyurethane, aminomethyl silicone oil, ammonium polyphosphate and titanate coupling agent is 1000:(70-90):(10-20):(5-8).

5. The bullet-proof and stab-resistant suit according to claim 1, wherein a solid content of waterborne polyurethane is 30-50%.

6. The bullet-proof and stab-resistant suit according to claim 2, wherein a solid content of waterborne polyurethane is 30-50%.

7. The bullet-proof and stab-resistant suit according to claim 3, wherein a solid content of waterborne polyurethane is 30-50%.

8. The bullet-proof and stab-resistant suit according to claim 4, wherein a solid content of waterborne polyurethane is 30-50%.

9. The bullet-proof and stab-resistant suit according to claim 1, wherein a particle size distribution of nano-montmorillonite is 30-50 nm.

10. The bullet-proof and stab-resistant suit according to claim 2, wherein a particle size distribution of nano-montmorillonite is 30-50 nm.

11. The bullet-proof and stab-resistant suit according to claim 1, wherein a total number of layers of the first aramid unidirectional cloth, the second aramid unidirectional cloth and the third aramid unidirectional cloth is 20-40 layers.

12. The bullet-proof and stab-resistant suit according to claim 2, wherein a total number of layers of the first aramid unidirectional cloth, the second aramid unidirectional cloth and the third aramid unidirectional cloth is 20-40 layers.

13. The bullet-proof and stab-resistant suit according to claim 3, wherein a total number of layers of the first aramid unidirectional cloth, the second aramid unidirectional cloth and the third aramid unidirectional cloth is 20-40 layers.

14. The bullet-proof and stab-resistant suit according to claim 4, wherein a total number of layers of the first aramid unidirectional cloth, the second aramid unidirectional cloth and the third aramid unidirectional cloth is 20-40 layers.

15. The bullet-proof and stab-resistant suit according to claim 5, wherein a total number of layers of the first aramid unidirectional cloth, the second aramid unidirectional cloth and the third aramid unidirectional cloth is 20-40 layers.

16. The bullet-proof and stab-resistant suit according to claim 6, wherein a total number of layers of the first aramid unidirectional cloth, the second aramid unidirectional cloth and the third aramid unidirectional cloth is 20-40 layers.

17. The bullet-proof and stab-resistant suit according to claim 7, wherein a total number of layers of the first aramid unidirectional cloth, the second aramid unidirectional cloth and the third aramid unidirectional cloth is 20-40 layers.

18. The bullet-proof and stab-resistant suit according to claim 1, wherein the buffer layer is one of an ethylene-vinyl acetate copolymer foam board, a polyvinyl chloride foam board and a polyethylene terephthalate foam board.

19. The bullet-proof and stab-resistant suit according to claim 1, wherein a thickness of the buffer layer is 1-3 mm.

20. A preparation method of the bullet-proof and stab-resistant suit according to claim 1, comprising the following steps:
mixing waterborne polyurethane, 1,4-butanediol, methyltrimethoxysilane, methyltrichlorosilane, dicyandiamide and nano-montmorillonite, and stirring evenly to obtain the first adhesive, injecting the first adhesive into an adhesive cartridge of a loom, and combining the first adhesive with aramid fiber to obtain a first aramid unidirectional cloth, and laminating 5-15 layers of first aramid unidirectional cloth to obtain a first protection layer;
mixing waterborne polyurethane, waterborne epoxy resin, methyl methacrylate, ethylene glycol, N-methyl diethanolamine and titanate coupling agent and stirring evenly to obtain the second adhesive, injecting the second adhesive into the adhesive cartridge of the loom, combining the second adhesive with aramid fiber to obtain a second aramid unidirectional cloth, hot pressing the second aramid unidirectional cloth, and then laminating 10-25 layers of second aramid unidirectional cloth to obtain a second protection layer;
mixing waterborne polyurethane, aminomethyl silicone oil, ammonium polyphosphate and titanate coupling agent and stirring evenly to obtain the third adhesive, injecting the third adhesive into the adhesive cartridge of the loom, combining the third adhesive with aramid fiber to obtain a third aramid unidirectional cloth, hot pressing the third aramid unidirectional cloth, and then laminating 5-12 layers of third aramid unidirectional cloth to obtain a third protection layer; and
sequentially stacking the first protection layer, the second protection layer, the third protection layer and the buffer layer to obtain a protection core sheet, and placing the protection core sheet in a sheath to obtain the bullet-proof and stab-resistant suit;
wherein a hot-pressing temperature is 150-170° C., a hot-pressing pressure is 2-3 MPa, and a hot-pressing time is 15-20 min.

* * * * *